April 20, 1965　　　A. E. SCHMID　　　3,178,816
POWER PRUNING SHEARS
Filed April 12, 1963　　　　　　　　　　　　　2 Sheets-Sheet 2
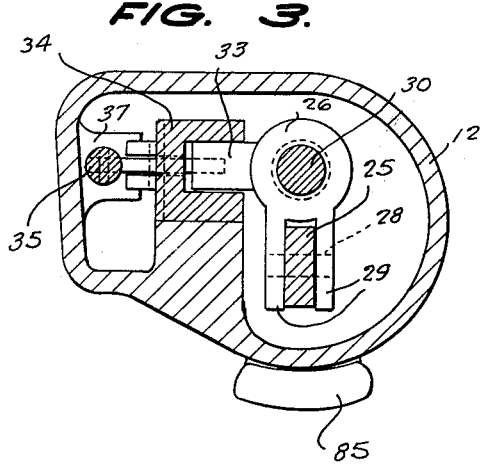
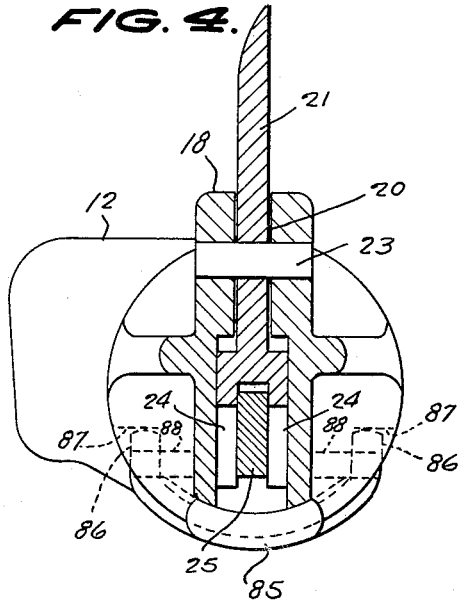
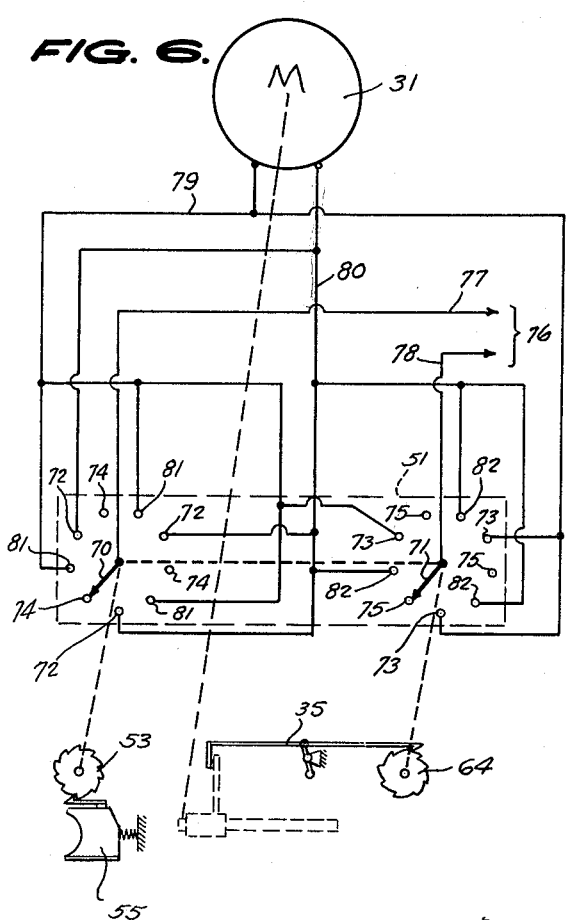
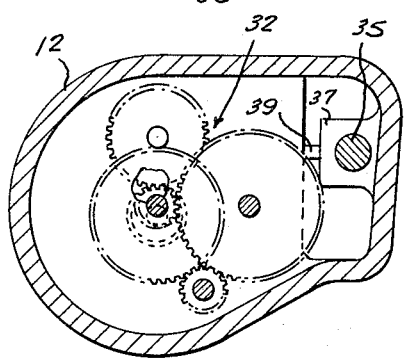
INVENTOR.
ARVIN E. SCHMID,
BY
McMorrow, Berman & Davidson
ATTORNEYS.

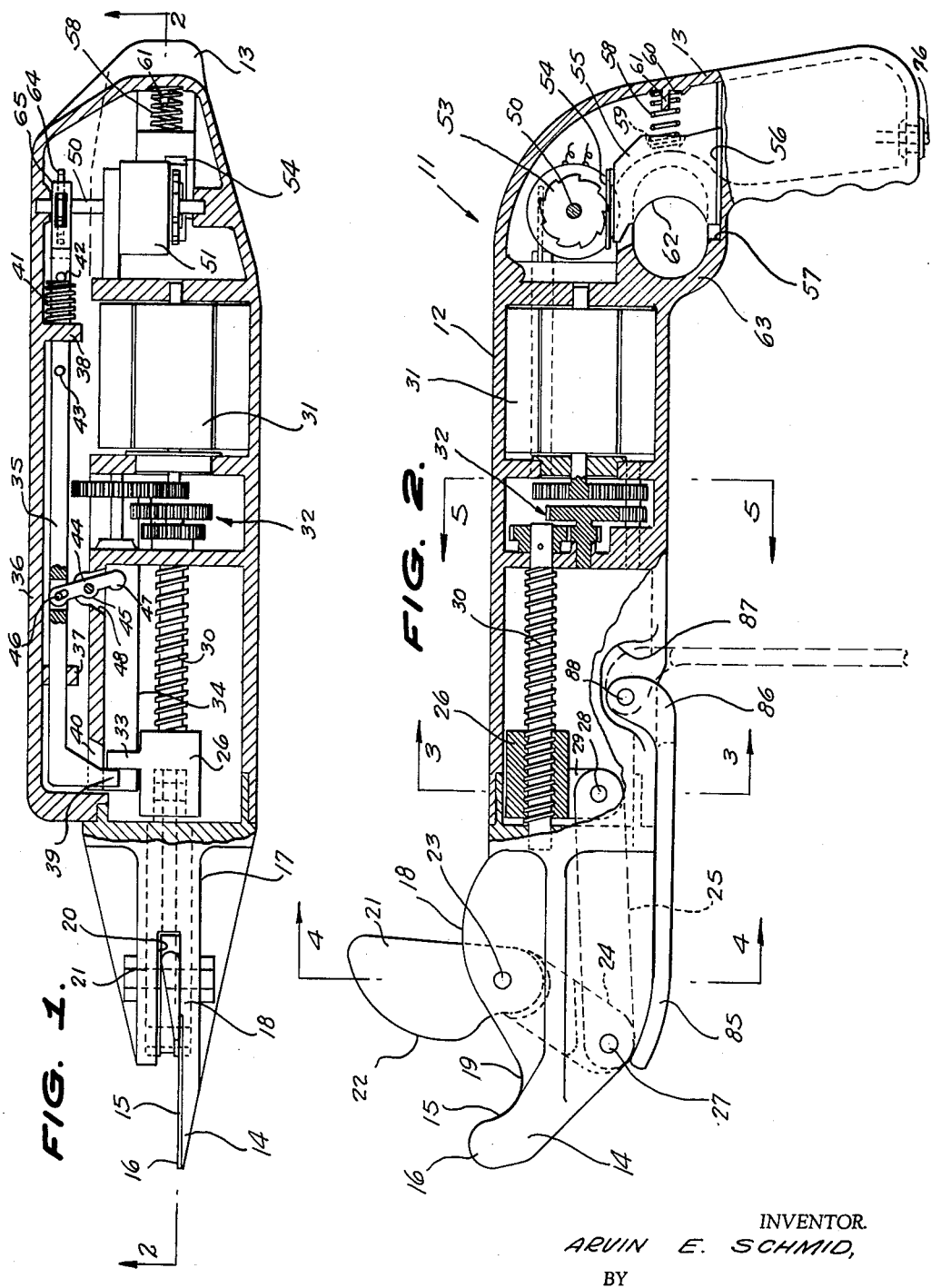

United States Patent Office 3,178,816
Patented Apr. 20, 1965

3,178,816
POWER PRUNING SHEARS
Arvin E. Schmid, 1821 Idaho Ave., Santa Monica, Calif.
Filed Apr. 12, 1963, Ser. No. 272,562
5 Claims. (Cl. 30—228)

This invention relates to motor-driven shears, and more particularly to electrically operated pruning shears.

A main object of the invention is to provide a novel and improved electrically operated pruning shears assembly which is relatively simple in construction, which is easy to operate, and which provides a complete shearing stroke with each actuation of its operating trigger, returning the movable shearing blade thereof to its starting position in preparation for the next operating cycle thereof.

A further object of the invention is to provide an improved motor-driven pruning shears assembly which is relatively inexpensive to manufacture, which is sturdy in construction, which is relatively compact in size, and which is relatively light in weight.

A still further object of the invention is to provide an improved electrically operated pruning implement of the type provided with a fixed shearing blade and a movable shearing blade cooperating with the fixed shearing blade, the movable shearing blade being driven by an electric motor, the implement being provided with trigger means which, when actuated, moves the shearing blade through a complete shearing stroke and returns it to a starting position automatically, preparing it for a subsequent stroke responsive to a further actuation of the operating trigger of the implement.

A still further object of the invention is to provide an improved electrically operated shearing tool for use in pruning and similar operations, the tool being easy to handle, being safe to use, and having cooperating shearing blades comprising a fixed blade and a movable blade, wherein the fixed blade is so contoured on its cutting edge as to prevent the slipping out of a branch being cut and the moving blade is so designed that it slides in relation to a branch being cut and wherein the cutting action is a combination of slicing and squeezing, so that the implement cuts cleanly and efficiently.

Further objects and advantages of the invention will become apparent from the following description and claims, and from the accompanying drawings, wherein:

FIGURE 1 is a horizontal cross sectional view taken longitudinally through an improved power shearing device constructed in accordance with the present invention.

FIGURE 2 is a longitudinal vertical cross sectional view taken substantially on the line 2—2 of FIGURE 1.

FIGURE 3 is an enlarged transverse vertical cross sectional view taken substantially on the line 3—3 of FIGURE 2.

FIGURE 4 is an enlarged transverse vertical cross sectional view taken substantially on the line 4—4 of FIGURE 2.

FIGURE 5 is an enlarged transverse vertical cross sectional view taken substantially on the line 5—5 of FIGURE 2.

FIGURE 6 is a schematic electrical circuit diagram showing the electrical connections of the elements of the power shearing device of FIGURES 1 to 5.

Referring to the drawings, 11 generally designates an improved power shearing device constructed in accordance with the present invention. The device 11 comprises an elongated casing 12 provided at one end with an integral depending handle 13 and being provided at its opposite end with an upwardly projecting fixed blade 14 having the upwardly concave, arcuately curved shearing edge 15. As shown in FIGURE 2, the fixed blade 14 is of generally hook-shape, having the upwardly extending end portion 16 and also being provided with a thickened main supported rib 17 which extends longitudinally and which has an upwardly convex top edge 18 curving smoothly to merge with the upwardly concave fixed cutting edge 15, as shown at 19.

The longitudinal rib 17 is formed with the forwardly opening longitudinal slot 20, and pivotally mounted in said slot is a movable shearing blade 21, said shearing blade being provided with the arcuately curved outwardly convex cutting edge 22 which faces the concave cutting edge 15 of the fixed blade 14.

The movable blade 21 is pivoted on a transverse shaft 23 secured in the slot 20, and the convex edge 22 is arranged so that when the blade 21 is rotated in a counter-clockwise direction, as viewed in FIGURE 2, the edge 22 will cooperate shearingly with the edge 15, gripping a twig or branch between the edges 15 and 22 and exerting a squeezing and slicing action on the twig as the counter-clockwise rotation of the blade 21 continues, thus effecting a clean and efficient cut. The fixed blade 14 cooperates with the rib 18 to define a seat to receive the twig or branch, and the edge 22 of the movable blade 21 is shaped with an arc of increasing curvature upwardly, so that as the blade 21 is moved against the twig or branch seated against the concave edge 15, the edge 22 exerts a sliding cutting action on the twig or branch, namely, a cutting action, which as mentioned above is a combination of slicing and squeezing. As can be readily seen from FIGURE 2, this is due to the fact that the edge 22 is not concentric with the pivot axis 23, but instead has its center located substantially at a point spaced upwardly and rearwardly from the pivot shaft 23, with the blade 21 in the normal position thereof shown in FIGURE 2.

The blade member 21 is integrally formed with a pair of depending parallel arms 24, 24, and pivotally connected to the lower ends of said arms and received therebetween is the end portion of a link bar 25 which extends into the intermediate portion of the casing 12 and is connected to a driving nut member 26. Thus, the forward end of the bar member 25 is pivotally connected at 27 between the arms 24, 24, and the rear end of the link bar 25 is pivotally connected at 28 to the nut member 26, being received between a pair of depending parallel lugs 29, 29 integrally formed with the nut member 26, as shown in FIGURE 3.

The nut member 26 is threadedly engaged on a driving screw 30 which is journaled longitudinally in the casing 12 and which is driven by a reversible electric motor 31 through a speed-reducing gear train designated generally at 32. The electric motor 31 is of a conventional type which may be reversed in direction by reversing its connections to the associated power supply line.

The nut member 26 is constrained to move longitudinally without rotation by the provision on the nut member of a laterally extending lug 33 which slidably engages in the longitudinally extending groove of a longitudinal channel member 34 secured within the casing 12, as shown in FIGURE 3.

Designated at 35 is a longitudinally extending bar member which is slidably supported adjacent one side wall 36 of casing 12 in a pair of spaced inwardly projecting apertured supporting lugs 37 and 38, the bar 35 being formed at its forward end with a laterally and inwardly projecting lug 39 which extends through a slot 40 in the end of the channel member 34 and projects into the path of movement of the lug 33, being engageable by said lug 33 as the nut 26 reaches the position thereof shown in FIGURES 1 and 2, namely, approaches the forward end of its path of travel. The longitudinally extending bar member 35 is biased rearwardly, namely, to the right as viewed in FIGURE 1, by a coiled spring 41 surrounding the bar member and bearing between a transverse pin 42 secured in the bar member, and the lug 38. A stop pin 43 is provided on the bar member 35 to the left of the lug 38, as viewed in FIGURE 1, to limit the rightward movement of the bar member 35.

Pivoted to the channel member 34 at 44 is a lever 45 having one end loosely connected at 46 to the bar member 35 and having its opposite end 47 projecting into the path of movement of the lug 33, the lever 45 being located adjacent the rear end of the driving screw 30, as viewed in FIGURE 1, namely, adjacent the rightward end of the path of travel of the driving nut 26. The lever 45 is mounted adjacent a slot 48 provided in the rear end portion of the channel 34, as is clearly shown in FIGURE 1, so that the arm 47 is engageable by the lug 33 as the nut 26 travels to the right after it has rotated the blade 21 in a counterclockwise direction, as viewed in FIGURE 2, through a shearing stroke with respect to the fixed shearing blade 14.

Designated at 50 is a rotary switch shaft which is transversely journaled in the rear portion of the casing 12 and which is the operating element of a double-pole nine-position switch 51 mounted in the rear portion of the casing above the handle 13.

Secured on one end portion of the shaft 50 is a first ratchet wheel 53 whose teeth are drivingly engageable by a slotted plate member 54 secured on the top of a trigger block 55, the block 55 being slidably mounted in a guide groove 56 formed in the upper portion of the handle 13 and being biased forwardly toward contact with the forward end wall of the recess 56, shown at 57, by a coiled spring 58. As shown in FIGURE 2, the spring 58 bears between a recess 59 provided in the rear edge of the block 55 and a seat 60 formed in the rear end wall of the handle 13 concentrically with respect to a stop pin 61, which serves to limit the rearward movement of the trigger block 55. The forward edge of the block 55 is concave, as shown at 62, and is exposed in a finger guard 63 integrally formed with the casing 12 adjacent the upper portion of the handle 13. The teeth of the ratchet wheel 53 are engageable in the slot of the plate 54 so that the ratchet wheel and the shaft 50 are rotated in a counterclockwise direction, as viewed in FIGURE 2, through an angle corresponding to the spacing between its teeth, with each rearward movement of trigger block 55 into contact with the stop pin 61. Upon release of the trigger block 55, the spring 58 returns the trigger block to its forward position, during which the plate 54 moves with the block without causing any rotation of the ratchet wheel 53 and shaft 50.

Secured on the opposite end portion of the shaft 50 is a second ratchet wheel 64 similar to the ratchet wheel 53 but with its teeth staggered relative to the teeth of ratchet wheel 53 by an angle substantially equal to one-half the angle between the ratchet teeth. Secured on the rear end of the rod member is a longitudinally slotted ratchet wheel-actuating plate 65 which extends over and receives the top ratchet teeth of the wheel 64.

Both plates 65 and 54 are in the form of leaf spring having longitudinal slots therein, so that they are readily yieldable and are resiliently urged to engage with the teeth of their associated ratchet wheels. The slotted plate 65 is effective to rotate the ratchet wheel 64 only when the bar member 35 is moved to the left, just as the plate 54 is effective to rotate the ratchet wheel 53 only when the trigger block 55 is moved to the right, as viewed in FIGURES 1 and 2. Thus, when the block 55 is moved to the right through a triggering stroke, namely, is moved to cause the block 55 to engage the pin 61, the switch 51 is actuated through one step of operation thereof. Thus, the aforesaid operation of the trigger block 55 will cause the poles 70 and 71 of the switch to be rotated in a counterclockwise direction, as viewed in FIGURE 6, into engagement with respective stationary contacts 72 and 73 of the switch, being disengaged from respective stationary contacts 74 and 75.

The implement is energized from a domestic electrical power source by means of a line cord 76 including the respective supply conductors 77 and 78. The line conductors 77 and 78 are connected respectively to the poles 70 and 71 of the switch 51. Connected to the respective terminals of the motor 31 are the wires 79 and 80. The switch 51 is provided with two banks of stationary contacts each comprising nine equally spaced contacts arranged in repeating groups of three contacts each, designated at 74, 72 and 81, for the bank of contacts associated with the pole 70, and 75, 73, 82 for the bank of stationary contacts associated with the pole 71.

Each of the stationary contacts 81 is connected to the wire 79, and each of the contacts 72 is connected to the wire 80. Similarly, each of the contacts 73 is connected to the wire 79 and each of the contacts 82 is connected to the wire 80. The contacts 74 and 75 are not connected to any of the line conductors and when the poles 70 and 71 engage said contacts, the motor 31 is deenergized. When the switch 51 is actuated to advance the poles 70 and 71 in a counterclockwise direction, as viewed in FIGURE 6, through one step of actuation, the poles 70 and 71 respectively engage the contacts 72 and 73 and connect the motor 31 to the line conductors 77 and 78, thus energizing the motor in its forward direction of operation. As above described, this occurs when the trigger member 55 is manually actuated to move it into engagement with the stop pin 61. The motor 31 drives the screw 30, rotating the same in a direction to move the nut member 26 from the position shown in FIGURE 2 toward the right, rotating the blade 21 in a counterclockwise direction through a shearing stroke. At the end of the shearing stroke of the blade, the lug 33 on nut 26 engages the arm 47, rotating the lever 45 counterclockwise, as viewed in FIGURE 1, and moving the bar member 35 to the left. The slotted plate 65 engages the tooth of ratchet wheel 64 received therein and rotates the ratchet wheel, causing the shaft 50 to rotate through a second operating step thereof, moving the poles 70 and 71 counterclockwise, as viewed in FIGURE 6, into engagement with the adjacent stationary contacts 81 and 82. This reverses the connections of the line conductors 77 and 78 to the terminals of the motor 31, causing the motor to reverse the direction of rotation of the screw 30, whereby the nut member 26 travels forwardly, namely, to the left, as viewed in FIGURES 1 and 2, elevating the blade 21 towards its normal open position, shown in FIGURE 2. As the blades 21 reaches its fully elevated open position, the lug 33 engages the lug 39 of bar 35, retracting the bar against the biasing force of the spring 41 and moving the bar sufficiently to rotate the ratchet wheel 64 through an angle corresponding to a further counterclockwise rotational step of shaft 50. This moves the poles 70 and 71 into engagement with the open stationary contacts 74 and 75, deenergizing the motor 31, and leaving the parts in the positions thereof shown in FIGURES 1, 2 and 6, ready for the next working cycle of the implement.

An exactly similar action may be provided by again manually actuating the trigger block 55, namely, by pulling the block back into contact with the pin 61. Thus, the machine can be operated by merely pulling back the trigger block 55 and then releasing same, which provides a complete shearing stroke of the blade 21 with subsequent return of the blade to its open elevated position.

It will be noted that the spring 41 acts against the pin 42 to bias the bar 35 to the right, as reviewed in FIGURE 1, normally holding the lug 39 in engagement with the lug 33. When the trigger member 55 is actuated, the nut 26 moves to the right because of the rotation of the drive screw 30, releasing the bar member 35 and allowing the spring 41 to move the bar member to the right, whereby to follow slotted plate 65 to engage a tooth of ratchet wheel 64 preparatory to rotating said wheel counter-clockwise on the next subsequent actuation of bar 35 toward the left. Pin 43 limits the rightward movement of the bar member 35 under the force of the spring 41. The arm 47 is suitably slotted at the connection 46 to allow the free longitudinal movement of the bar member 35. On the return stroke of the bar member 35, its movement to the left is cushioned by the compression of the spring 41. The spring 41 acts to slow the action to nearly the point of stopping, so that, at the moment of switching off there is a minimum of system overtravel. The spring acts, as it is compressed by the contact of lug 33 with arm 47, to slow all moving parts nearly to a stop so that the strain on said parts caused by the sudden reversal of the motor is at a minimum.

The shaft 50 is preferably provided with conventional yieldable detent means assuring proper registry of the poles 70 and 71 with the contracts 72, 81, 74 and 75, 73 and 82 in the various stepped positions of the switch.

As above mentioned, the casing 12 is provided with the rear depending main integral handle 13. Said casing is also provided with an auxiliary pivoted handle 85, hingedly connected to the intermediate portion of the casing. Thus, the auxiliary handle 84 is provided with a pair of parallelspaced opposing pivot lugs 86, 86 which are received in respective recesses 87, 87 provided on the opposite sides of the casing 12 and pivotally connected thereto by transversely aligned hinge pins 88, 88. Normally, the auxiliary handle member 85 is folded against the bottom of the casing 12, as shown in FIGURE 2, but may be rotated downwardly, namely, in a counterclockwise direction, as viewed in FIGURE 2, towards the dotted view position thereof, so that it may be employed as an auxiliary handle, enabling the operator to hold the implement with both hands while using same.

As above mentioned, since the slotted plate members 65 and 54 are of spring material, said plate members are readily yieldable to allow counterclockwise rotation of the teeth of the ratchet wheels 64 and 53 therepast.

As shown in FIGURE 2, the resilient slotted plate member 54 is supported so that it is spaced a sufficient distance above the top surface of the trigger block 55 so that it may freely flex downward when the ratchet wheel 53 rotates in a counterclockwise direction relative thereto.

An actuation of the trigger block 55 produces an automatic complete shearing cycle, with return to starting position, whether or not the trigger block is held retracted or released. However, an additional trigger pull, while the cycle is in progress, will override the automatic switch, a feature of substantial value in case of jamming.

While a specific embodiment of an improved power shearing device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A power shearing device comprising an elongated casing, a first shearing blade fixedly mounted on said casing, a second shearing blade pivoted to said casing and being shearingly cooperable with said first blade, a reversible electric motor mounted in said casing, a drive screw journaled in said casing, means drivingly connecting said motor to said screw, a nut member threaded on said screw, means drivingly connecting said nut member to said second shearing blade, a pair of supply conductors, means to connect said supply conductors to said motor to drive same in a direction to move said nut member and drive said second blade through a shearing stroke relative to said first blade, and means to reverse the connections of said conductors to said motor responsive to movement of said nut member to a predetermined position in said casing.

2. A power shearing device comprising an elongated casing, a first shearing blade flexibly mounted on said casing, a second shearing blade pivoted to said casing and being shearingly cooperable with said first blade, a reversible electric motor mounted in said casing, a drive screw journaled in said casing, means drivingly connecting said motor to said screw, a nut member threaded on said screw, means drivingly connecting said nut member to said second shearing blade, said nut member being movable between a normal rearward position to a predetermined forward position responsive to operation of said motor in a first direction, a pair of supply conductors, means to connect said supply conductors to said motor to drive same in said first direction, means to reverse the connections of said conductors to said motor responsive to the movement of said nut member to said predetermined forward position, whereby to reverse the movement of the nut member, said second shearing blade being driven through a shearing stroke when the nut member moves to said forward position and being retracted when the nut member reverses its movement, and means to disconnect said conductors from said motor when the nut member returns to said normal rearward position.

3. A proper shearing device comprising a casing, a first shearing blade fixed to said casing, a second shearing blade pivoted to the casing and being shearingly cooperable with the first blade, said second blade having a normal position spaced from said first blade, a drive screw journaled in the casing, a nut member threaded on said screw and being operatively connected to said second blade, a reversible electric motor drivingly connected to said screw, manually movable trigger means on the casing, a multiple-position switch member movably mounted in the casing, means to operate said switch member to a first position responsive to actuation of said trigger means, means energizing said motor in a direction to drive the second blade from said normal position through a shearing stroke when the switch member is in said first position, means to operate said switch member to a second position at the end of said shearing stroke means energizing the motor in a reverse direction when the switch member is in said second position, means to operate said switch member to a third position when said second blade returns to said normal position, and means deenergizing said motor when the switch member is in said third position.

4. A power shearing device comprising a casting, a first shearing blade fixed to said casing, a second shearing blade pivoted to the casing and being shearingly cooperable with the first blade, said second blade having a normal position spaced from said first blade, a drive screw journaled in the casing, a nut member threaded on said screw and being operatively conected to said second blade, a reversible electric motor drivingly connected to said screw, manually movable trigger means on the casing, a multiple-position switch member rotatably mounted in the casing, means to rotate said switch member to a first position responsive to actuation of said trigger means, means energizing said motor in a direction to drive the second blade from said normal position through a shearing stroke when the switch member is in said first position, a bar member slidably mounted in the casing and drivingly engaging said switch member, abutment means on the nut member engageable with said bar member to rotate said switch member to a second position at the end of said shearing stroke, means energizing the motor in a reverse direction when the switch member is in said second position, means drivingly connected to said bar member and operatively engageable by said abutment means to move the bar member to rotate said switch member to a third position when said second blade returns to said normal position, and means deenergizing said motor when the switch member is in said third position.

5. A power shearing device comprising a casing, a first shearing blade fixed to said casing, a second shearing blade pivoted to the casing and being shearingly cooperable with the first blade, said second blade having a normal position spaced from said first blade, a drive screw journaled in the casing, a nut member threaded on said screw and being operatively connected to said second blade, a reversible electric motor drivingly connected to said screw, manually movable trigger means on the casing, a multiple-position switch member rotatably mounted in the casing, means to rotate said switch member responsive to actuation of said trigger means, means energizing said motor in a direction to drive the second blade from said normal position through a shearing stroke when the switch member is in a first position, a bar member slidably mounted in the casing and divingly engaging said switch member, abutment means on the nut member engageable with said bar member to rotate said switch member to a second position at the end of said shearing stroke, means energizing the motor in a reverse direction when the switch member is in said second position, means drivingly connected to said bar member and operatively engageable by said abutment means to move the bar member to rotate said switch member to a third position when said second blade return to said normal position, and means deenergizing said motor when the switch member is in said third position, said trigger means being operable to rotate said switch member at any time, whereby operation of the trigger means while a shearing cycle is in progress will override the positioning of the switch member.

References Cited by the Examiner
UNITED STATES PATENTS

| | | | |
|---|---|---|---|
| 2,488,224 | 10/49 | Mothorn | 30—228 X |
| 2,543,109 | 2/51 | Holowka | 30—228 |
| 3,052,980 | 9/62 | Fieser | 30—228 |

WILLIAM FELDMAN, *Primary Examiner.*

MILTON S. MEHR, *Examiner.*